United States Patent
Nagase et al.

(10) Patent No.: US 10,360,461 B2
(45) Date of Patent: Jul. 23, 2019

(54) TRAVEL CONTROL DEVICE FOR VEHICLE

(71) Applicant: SUBARU CORPORATION, Tokyo (JP)

(72) Inventors: Takayuki Nagase, Tokyo (JP); Eiichi Shiraishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/584,668

(22) Filed: May 2, 2017

(65) Prior Publication Data

US 2017/0351926 A1 Dec. 7, 2017

(30) Foreign Application Priority Data

Jun. 7, 2016 (JP) ................................. 2016-113802

(51) Int. Cl.
*G06K 9/00* (2006.01)
*G05D 1/02* (2006.01)
*B60W 30/18* (2012.01)
*B60W 30/045* (2012.01)
*G05D 1/00* (2006.01)

(52) U.S. Cl.
CPC ... *G06K 9/00798* (2013.01); *B60W 30/18145* (2013.01); *B60W 30/18163* (2013.01); *G05D 1/024* (2013.01); *G05D 1/0214* (2013.01); *G05D 1/0246* (2013.01); *G05D 1/0257* (2013.01); *G05D 1/0274* (2013.01); *G05D 1/0278* (2013.01); *G06K 9/00805* (2013.01); *B60W 30/045* (2013.01); *B60W 2550/10* (2013.01);
(Continued)

(58) Field of Classification Search
CPC .......... G06K 9/00798; B60W 50/0097; B60W 50/0002; B60W 30/045; G08G 1/167
See application file for complete search history.

(56) References Cited

U.S. PATENT DOCUMENTS

| 2016/0140847 A1* | 5/2016 | Kawamata | G08G 1/163 701/36 |
| 2016/0167650 A1* | 6/2016 | Clarke | B60W 30/00 701/28 |
| 2017/0043784 A1* | 2/2017 | Takami | B60W 30/18154 |

FOREIGN PATENT DOCUMENTS

| JP | 2002-310711 A | 10/2002 |
| JP | 2008-076366 A | 4/2008 |

(Continued)

OTHER PUBLICATIONS

Office Action issued in corresponding Japanese Patent Application No. 2016-113802, dated Feb. 6, 2018.

*Primary Examiner* — Anne M Antonucci
*Assistant Examiner* — Renee LaRose
(74) *Attorney, Agent, or Firm* — McDermott Will & Emery LLP

(57) ABSTRACT

A travel control device for a vehicle is configured to execute a self-driving control based on a traveling state and traveling environment information of the vehicle. The travel control device includes a controller. The controller estimates execution of a right turn and a left turn from a traveling lane of the vehicle based on the traveling state and traveling environment information. When execution of either one of the right turn and the left turn from the traveling lane of the vehicle is estimated, the controller varies a traveling path from the traveling lane to a lane after the execution of the estimated turn according to the traveling state and traveling environment information to perform a right or left turn control of the vehicle.

9 Claims, 9 Drawing Sheets

(52) U.S. Cl.
CPC ....... *B60W 2550/30* (2013.01); *G05D 1/0055* (2013.01)

(56) References Cited

FOREIGN PATENT DOCUMENTS

| | | |
|---|---|---|
| JP | 2010-191803 A | 9/2010 |
| WO | 2015-186648 A1 | 12/2015 |

* cited by examiner

TRAVEL CONTROL DEVICE FOR VEHICLE

CROSS-REFERENCE TO RELATED APPLICATIONS

The present application claims priority from Japanese Patent Application No. 2016-113802 filed on Jun. 7, 2016, the entire contents of which are hereby incorporated by reference.

BACKGROUND

1. Technical Field

The present invention relates to a travel control device for a vehicle having a self-driving function for automatically executing a right turn or a left turn from a travel lane of a vehicle.

2. Related Art

In recent years, various technologies have been developed and put into practical use in vehicles to support self-driving and driver's driving so as to carry out the driver's driving more comfortably and safely. For example, Japanese Unexamined Patent Application Publication No. 2010-191803 (hereinafter referred to as Patent Literature 1) discloses a technique for a driving assistance device in which when a preceding vehicle turns in one of a right direction and a left direction, it is assumed that the preceding vehicle turns while performing large turning operation of turning in the one direction after turning in the other direction, and a vehicle is prevented from entering a space that is temporarily generated by the large turning operation of the preceding vehicle.

Incidentally, when the vehicle turns to the right or left, a driver is required to monitor a shape (a bending angle of a right or left turn road with respect to a travel lane) of a lane after having turned to the right or left (right or left turn road) of the traveling lane, a width of the right or left turn road, and a situation of another vehicle present on the right or left turn road, and to set a turning speed and so on for turning, taking a turning performance of the vehicle into consideration. In this way, when the vehicle turns to the right or left, appropriate driving operation has to be performed with the use of a lot of information, and in order to realize a safe and accurate right or left turn even in self-driving, various information and processing for those information are required, resulting in a problem that appropriate control according to a situation is required besides the driving assistance technology as disclosed in Patent Literature 1 described above.

SUMMARY OF THE INVENTION

It is desirable to provide a travel control device for a vehicle that is capable of accurately determining execution and non-execution of right and left turns on the basis of a road environment even when performing self-driving, and turning to the right and left safely and smoothly with an appropriate traveling path at an appropriate vehicle speed in executing the right and left turns.

According to an aspect of the present invention provides a travel control device for a vehicle. The travel control device executes a self-driving control based on a traveling state of the vehicle and traveling environment information of the vehicle. The device includes a controller. The controller is configured to estimate execution of a right turn and a left turn from a traveling lane of the vehicle based on the traveling state and the traveling environment information. When execution of either one of the right turn and the left turn from the traveling lane of the vehicle is estimated, the controller is configured to vary a traveling path from the traveling lane to a lane after the execution of the estimated turn according to the traveling state and the traveling environment information to perform a right or left turn control of the vehicle.

BRIEF DESCRIPTION OF THE DRAWINGS

FIGS. 12A and 12B are illustrative diagrams of a turning speed correction according to a bending angle of the right or left turn road to the traveling lane according to the example of the present invention, in which FIG. 12A is a diagram illustrating a characteristic of a turning speed correction coefficient and FIG. 12B is an illustrative diagram of the bending angle of the right or left turn road with respect to the driving lane.

DETAILED DESCRIPTION

Hereinafter, an example according to the present invention will be described with reference to the drawings.

Figure 1:
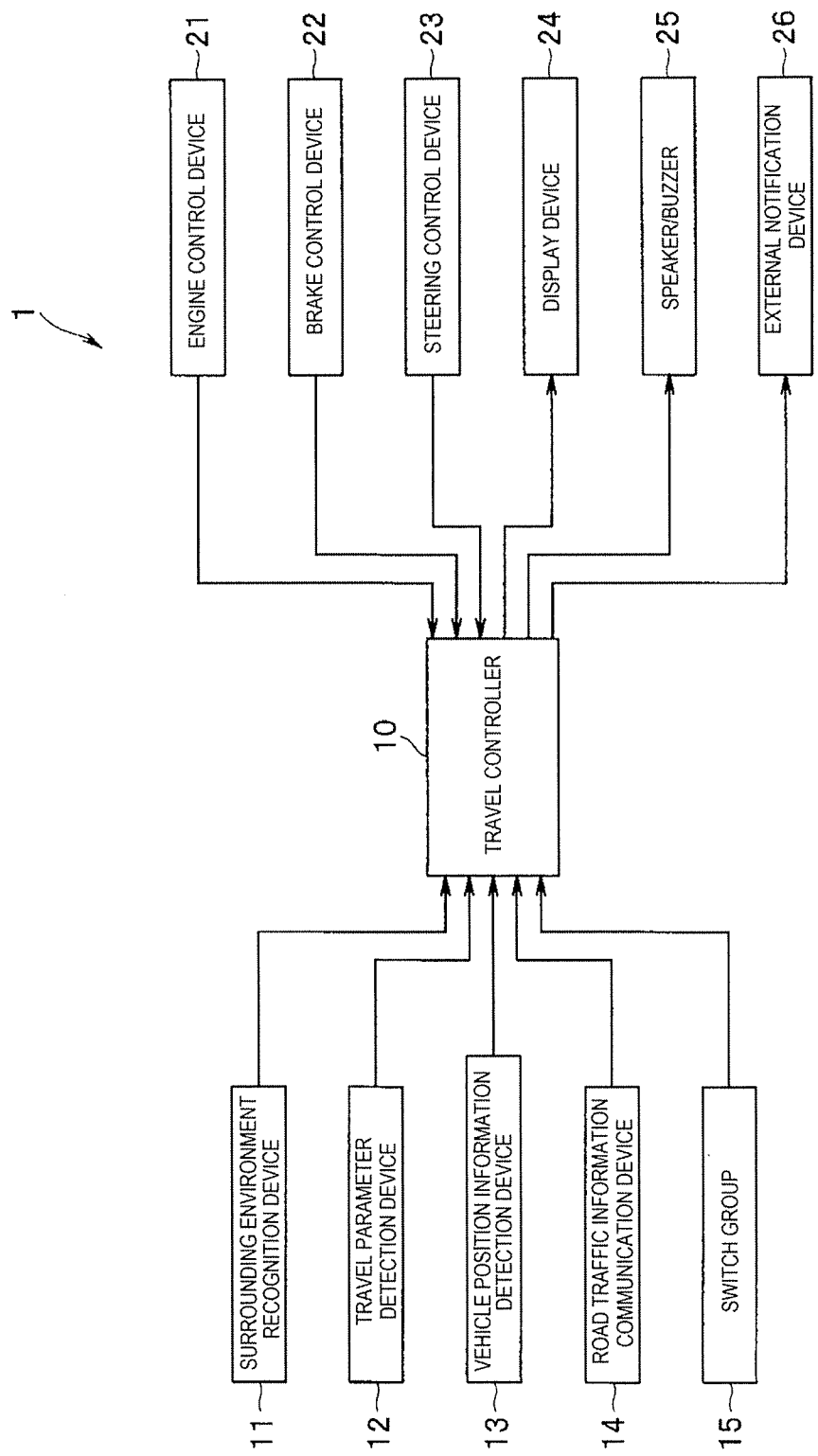
FIG. 1 is an overall configuration diagram of a travel control device for a vehicle according to an example of the present invention.

Referring to FIG. 1, reference numeral 1 represents a travel control device mounted on a vehicle 3. In the travel control device 1, respective input devices of a surrounding environment recognition device 11, a travel parameter detection device 12, a vehicle position information detection device 13, a road traffic information communication device 14, and a switch group 15 are coupled to a travel controller 10. In addition, respective output devices of an engine control device 21, a brake control device 22, a steering control device 23, a display device 24, a speaker/buzzer 25, and an external notification device 26 are coupled to the travel controller 10.

The surrounding environment recognition device 11 is configured to include a camera device (stereo camera, monocular camera, color camera, and the like) including a solid-state imaging device disposed in a vehicle cabin, which acquires image information by imaging an external environment of a vehicle, a radar device (laser radar, millimeter-wave radar, and the like) which receives a reflected wave from a three-dimensional object present around the vehicle, a sonar, and the like (hitherto, not illustrated).

For instance, based on the image information captured by the camera device, the surrounding environment recognition device 11 performs a known grouping process on distance information, and compares the distance information subjected to the grouping process with preset three-dimensional road shape data or three-dimensional object data. In this manner, based on lane marking line data, side wall data relating to guardrails or curbstones present along a road, and three-dimensional object (obstacle) data relating to vehicles (preceding vehicle, oncoming vehicle, side-by-side vehicle, parking vehicle) or the like, the surrounding environment recognition device 11 extracts a relative position (distance and angle) from the vehicle 3 together with a speed. In the lane marking line data, the shape of a lane marking line, a lane width, and the like are extracted. In addition, based on reflected wave information acquired by the radar device, the surrounding environment recognition device 11 detects a position (distance and angle) of the wave reflected three-dimensional object together with the speed.

The travel parameter detection device 12 detects travel information of the vehicle 3. Specifically, the travel information includes a vehicle speed (also including a wheel speed of each wheel), longitudinal acceleration, lateral acceleration, a steering torque, a steering angle, a yaw rate, an accelerator position, a throttle position, a road surface gradient of a travel road surface, an estimated value of a road surface friction coefficient, ON-OFF of a brake pedal switch, ON-OFF of an accelerator pedal switch, ON-OFF of a turn signal switch, ON-OFF of a hazard lamp switch, and the like.

For instance, the vehicle position information detection device 13 is a known navigation system. For instance, the vehicle position information detection device 13 receives a radio wave transmitted from a global positioning system (GPS) satellite, and detects the current position, based on the radio wave information and self-contained navigation information using a vehicle speed signal obtained from an acceleration sensor, a gyro, and the rotation of the tire. The vehicle position information detection device 13 identifies a position of the vehicle 3 on map data in a flash memory, a compact disc (CD), a digital versatile disc (DVD), a Blu-ray (registered trademark) disc, a hard disk drive (HDD), server information and the like.

As the map data, the vehicle position information detection device 13 has road data and facility data. The road data includes position information and type information of a link, position information and type information of a node, curve curvature (curve radius) information, and information relating to a connection relationship between the node and the link, that is, intersection information, road branch and junction information, and the maximum vehicle speed information in a branch road. The facility data has multiple records for each facility. Each record has data indicating name information, location information, facility type (each type of department stores, shops, restaurants, parking lots, parks, and repair bases for vehicle's malfunctions) information of a target facility. Then, the position of the vehicle 3 on the map is displayed. If a destination is input by an operator, a route from a starting place to the destination is calculated in a predetermined manner. The route is displayed in the display device 24 such as a display or a monitor. Alternatively, the speaker/buzzer 25 performs voice guidance so as to freely guide the route.

The road traffic information communication device 14 is a so-called vehicle information and communication system (VICS: registered trademark), and is a device which receives real time road traffic information relating to traffic jams, accidents, construction work, a required time, and parking lots through FM multiplex broadcasting or from a transmitter on the road, and which displays the received traffic information on the above-described map data.

The switch group 15 is a switch group relating to driving support control for drivers. For instance, the switch group 16 is configured to include a switch for travel control at a preset fixed speed, a switch for controlling the vehicle 3 to travel to follow a preceding vehicle while an inter-vehicle distance from the preceding vehicle and an inter-vehicle time are maintained to a preset fixed value, a switch for lane keeping control to control the vehicle 3 to keep the lane by maintaining a travel lane to a set lane, a switch for lane deviation preventing control to prevent the vehicle 3 from deviating from the travel lane, a switch for overtaking control permission switch to permit the vehicle 3 to overtake the preceding vehicle (overtaking target vehicle), a switch for self-driving control to cooperatively perform all these controls, a switch for setting a vehicle speed, an inter-vehicle distance, an inter-vehicle time, and a speed limit which are required for each control, or a switch for releasing each control.

For instance, the engine control device 21 is a known control unit which performs main control on a vehicle engine (not illustrated) such as fuel injection control, ignition timing control, and control for an electronic control throttle valve, based on an intake air amount, a throttle position, an engine coolant temperature, an intake air temperature, oxygen concentration, a crank angle, an accelerator position, and other vehicle information items. In addition, for instance, the engine control device 21 is configured to perform known traction control for decreasing a drive force (decreasing a drive torque) so that a tire slippage rate reaches a preset target slippage rate, in a case where predetermined slippage occurs in drive wheels. In a self-driving state, in a case where an acceleration (requested acceleration) required for each self-driving control described above (control for preventing collision with obstacles, constant speed travel control, following travel control, lane keeping control, lane deviation preventing control, and additionally overtaking control) is input from the travel controller 10, the engine control device 21 calculates a drive torque (self-driving request torque), based on the requested acceleration, and performs engine control in which the self-driving request torque is set to a target torque.

For instance, the brake control device 22 is a known control unit which can control a brake device (not illustrated) of four wheels independently of a driver's brake operation, based on a brake switch, a wheel speed of the four wheels, a steering angle, a yaw rate, other vehicle information items. The brake control device 22 performs a yaw brake control to control a yaw moment added to the vehicle such as known ABS control and a sideslip prevention control that controls the turning motion of the vehicle by adding the yaw moment to the vehicle due to a braking/driving force difference between the respective wheels.

In addition, in a self-driving state, in a case where a deceleration (requested deceleration) required for each self-driving control described above (control for preventing collision with obstacles, constant speed travel control, following travel control, lane keeping control, lane deviation preventing control, and additionally overtaking control) is input from the travel controller 10, the brake control device 22 sets target fluid pressure of a wheel cylinder of each wheel brake, based on the requested deceleration, and performs brake control.

For instance, the steering control device 23 is a known control device which controls an assist torque generated by an electric power steering motor (not illustrated) disposed in a vehicle steering system, based on a vehicle speed, a steering torque, a steering angle, a yaw rate, and other vehicle information items. In addition, the steering control device 23 can perform a lane keeping control for travel control in which the above-described travel lane is maintained as the set lane (target course), lane deviation preventing control to prevent the vehicle 3 from deviating from the travel lane, and self-driving steering control to cooperatively perform these controls. A steering angle or a steering torque required for the lane keeping control, the lane deviation preventing control, and the self-driving steering control is calculated by the travel controller 10, and is input to the steering control device 23. In accordance with an input controlled variable, the electric power steering motor is controlled and driven.

For instance, the display device 24 is a device which gives a visual warning or notice to a driver, such as a monitor, a display, or an alarm lamp. In addition, the speaker/buzzer 25 is a device which gives an auditory warning or notice to a driver.

The external notification device 26 is provided as an external notification unit, which is, for example, a device that audibly notifies an outside of the vehicle by a warning such as a klaxon or a horn. The external notification device 26 also temporarily repetitively turns on headlamps in a high beam (headlight flashing) so as to externally execute visual announcement.

Based on each input signal from the above-described respective devices 11 to 15, the travel controller 10 performs the self-driving control by cooperatively performing the control for preventing collision with obstacles, the constant speed travel control, the following travel control, the lane keeping control, the lane deviation preventing control, and additionally the overtaking control. In the self-driving state, the travel controller 10 estimates the execution of the right turn and the left turn from the traveling lane of the vehicle 3 based on the traveling state of the vehicle 3 and the traveling environment information, and makes a traveling path from the traveling lane to a lane after having turned to the right or left turn (right or left turn road) variable according to the traveling state of the vehicle 3 and the traveling environment information to control the right and left turns when execution of either of the right turn or the left turn from the traveling lane of the vehicle 3 is estimated. Specifically, when a lane width W1 of the right or left turn road is narrower than a first lane width Wc1 set in advance through experiments, calculations, or the like, the right or left turn from the traveling lane to the right or left turn road is prohibited. When the lane width W1 of the right or left turn road is wider than the preset first lane width Wc1 and does not exceed a second lane width Wc2 set in advance through experiments, calculations, or the like, a turning radius of the traveling path turning to the right or left from the traveling lane to the right or left turn road is corrected to increase so that the vehicle can go straight to the right or left turn road. Furthermore, when another vehicle is detected on the right or left turn road, a movement situation of another vehicle is monitored. When another vehicle is moving, after the movement of another vehicle has been completed, the right or left turn control from the traveling lane to the right or left turn road is executed. In addition, when another vehicle is detected on the right or left turn road, a movement situation of another vehicle is monitored, and when another vehicle is stopped, an external notification device 26 issues a signal to another vehicle stopped to preferentially perform the movement of another vehicle.

Next, a self-driving control program executed by the travel controller 10 will be described with reference to flowcharts in FIGS. 2 to 5.

First, in Step (hereinafter, abbreviated as "S") 101, it is determined whether the vehicle 3 is in a self-driving state. In a case where the vehicle 3 is not in the self-driving state, the program is finished. In a case of the self-driving state, the process proceeds to S102.

Upon proceeding to S102, it is determined whether there is a right turn portion or a left turn portion in front of the traveling lane of a target course (for example, a navigation route on map information of a navigation system) guided by the self-driving.

As a result of the determination in S102, if it is determined that there is neither the right nor left turn portion, the program proceeds to S103, the self-driving for the target course is continued as it is, and the program exits.

On the contrary, if it is determined that there is the right or left turn portion, the program proceeds to S104, where information on the right or left turn road and the travel road is acquired based on the map information of the navigation system. Specifically, information on positions of the traveling lane and the right or left turn road, a shape (bending angle) of the right or left turn road with relative to the traveling lane, lane widths of the traveling lane and the right or left turn road, a speed limit and the like is acquired.

Figure 10:
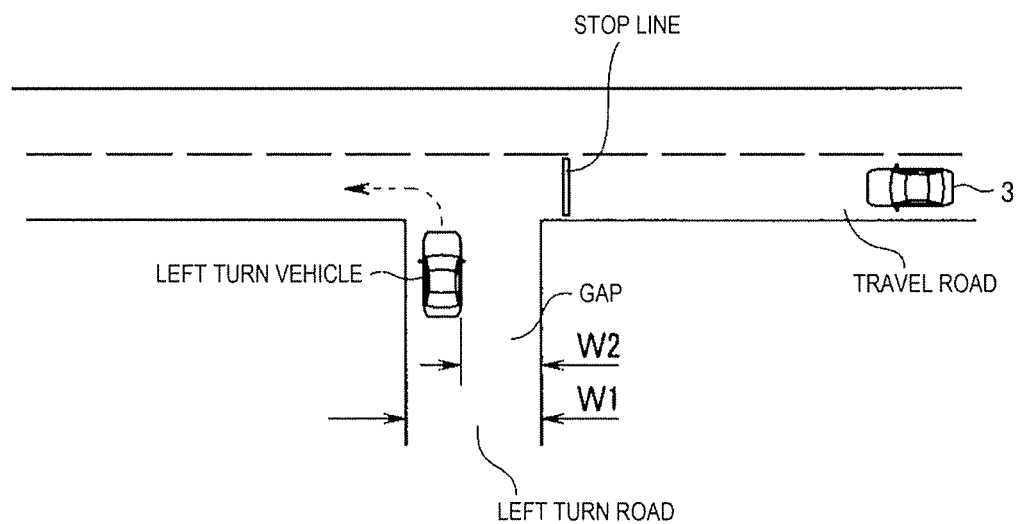
FIG. 10 is an illustrative diagram of a left turn in the case where another vehicle is present on the left turn road according to the example of the present invention.

Subsequently, the program proceeds to S105, and information on the right or left turn road and the travel road is acquired based on the image information of the surrounding environment recognition device 11. Specifically, information on the positions of the traveling lane and the right or left turn road, the shape (bending angle) of the right or left turning road relative to the traveling lane, the lane widths of the traveling lane and the right or left turn road, information on another vehicle (movement information and so on based on a position change (speed) of the vehicle) present within the right or left turn road, a width dimension (refer to FIG. 10) of a gap through which the vehicle 3 can pass, which is defined by another vehicle in the right or left turn road, and so on are acquired.

Next, the program proceeds to S106, and it is determined whether the width W1 of the right or left turn road is equal to or less than the preset first lane width Wc1 (W1≤Wc1).

Figure 6:
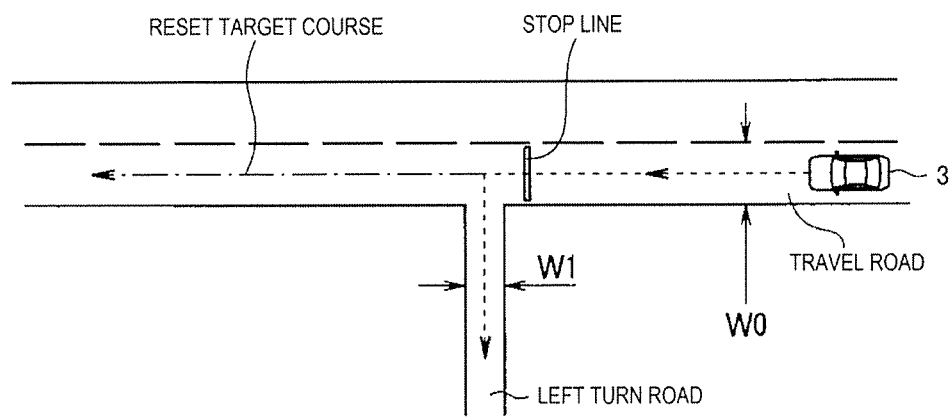
FIG. 6 is an illustrative diagram of a case where a vehicle travels without making a left turn on a narrow left turn road according to the example of the present invention.

When W1≤Wc1 is met as a result of the determination in S106, it is determined to be difficult to turn the right or left at present because the set right or left turn road is too narrow, and the program proceeds to S107. In S107, the target course in the self-driving is reset to a course that does not turn to the right or left at the right or left turn road set at present. The program proceeds to S108 where the self-driving is continued (refer to FIG. 6).

On the other hand, as a result of the determination in S106, if W1>Wc1 is met, the program proceeds to S109, and it is determined whether another vehicle is present in the right or left turn road.

If it is determined in S109 that no other vehicle is present in the right or left turn road, the program proceeds to S110, and it is determined whether the lane width W1 of the right or left turn road is equal to or less than the preset second lane width Wc2 (W1≤Wc2).

As a result of the determination in S110, if W1>Wc2 is met, the program proceeds to S111, and a turning vehicle speed Vt for turning to the right or left at the right or left turn road is set according to, for example, the following Expression (1).

$$Vt=G\theta\cdot\text{MIN (V0,V1: speed limit of traveling lane, speed limit of right or left turn road)} \quad (1)$$

In this example, Gθ is a turning speed correction coefficient to be described later, which is set in advance by experiments, calculations, or the like. In addition, an operation portion subsequent to MIN is a MIN function for selecting a minimum speed from a vehicle speed V0 preset based on the width W0 of the traveling lane, a vehicle speed V1 preset based on the width W1 of the right or left turn road, a speed limit of the traveling lane acquired from the map information, a speed limit of the right or left turn road acquired from the map information.

Figure 12A:
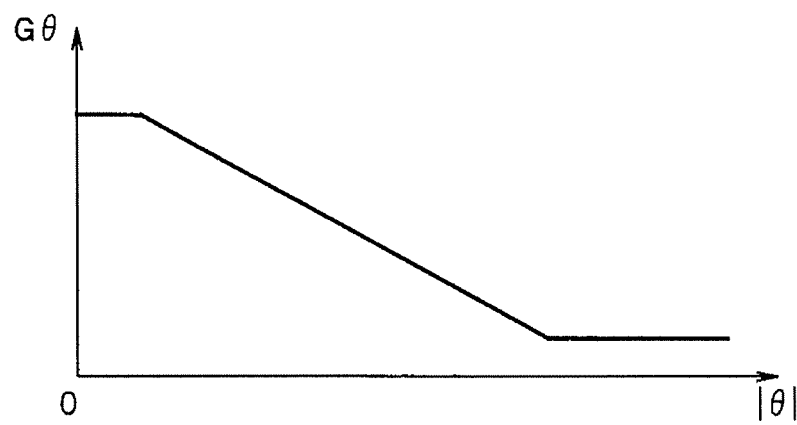
Figure 12B:
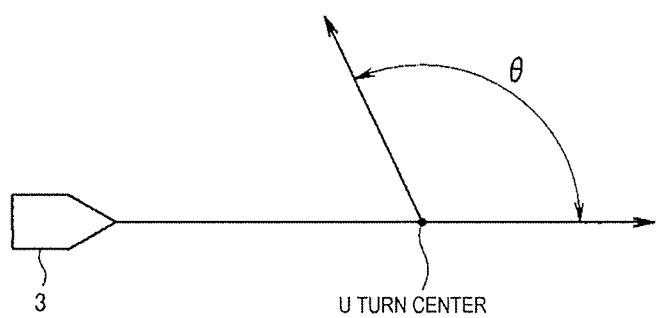

For example, as illustrated in FIGS. 12A and 12B, the turning speed correction coefficient Gθ is set to be smaller as a bending angle θ of the right or left turn road relative to the traveling lane increases more (toward a U-turn trend), and the speed is corrected so that the vehicle can be turned at a low speed and smoothly.

Figure 11:
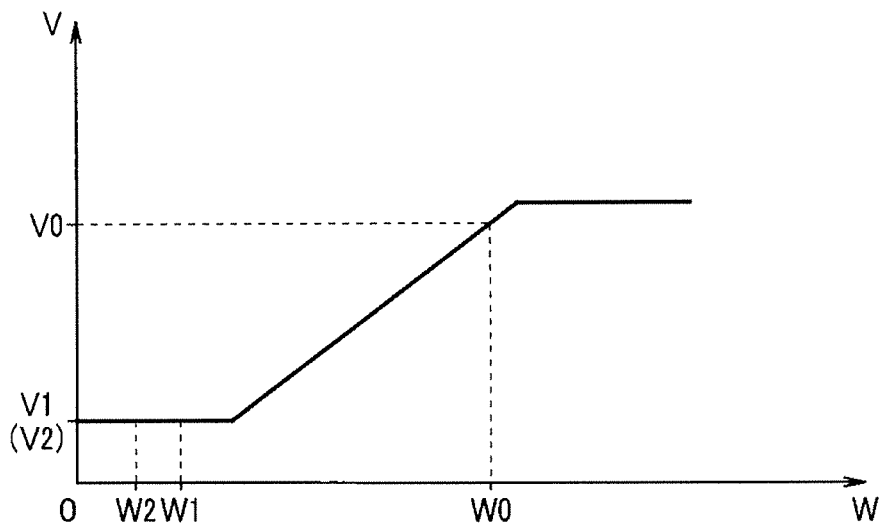
FIG. 11 is an illustrative view illustrating an example of the characteristics of a turning speed set depending on a lane width according to the example of the present invention.

Further, the vehicle speed V0 set in advance on the basis of the width W0 of the travel lane and the vehicle speed V1 set in advance on the basis of the width W1 of the right or left turn road are set with reference to a map of characteristics of the turning speeds set according to the lane widths as illustrated in FIG. 11. The map is set in advance by, for example, experiments, calculations, or the like.

Figure 7:
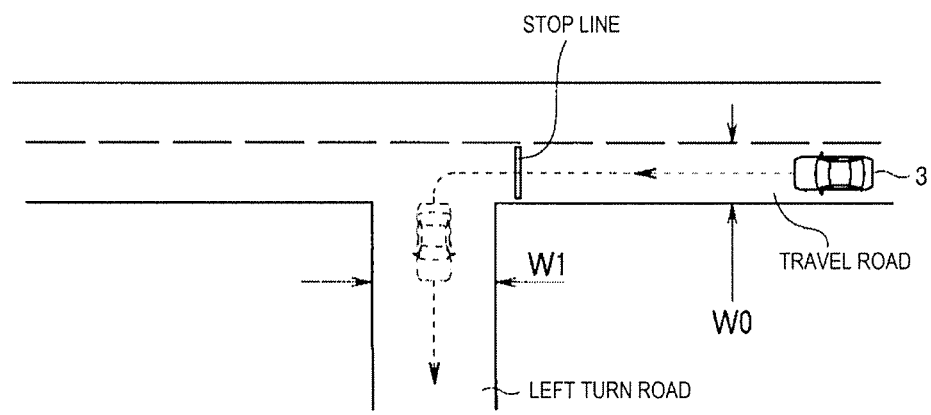
FIG. 7 is an illustrative diagram of a case where the vehicle makes the left turn on a wide left turn road at a normal turning path according to the example of the present invention.
Figure 13:
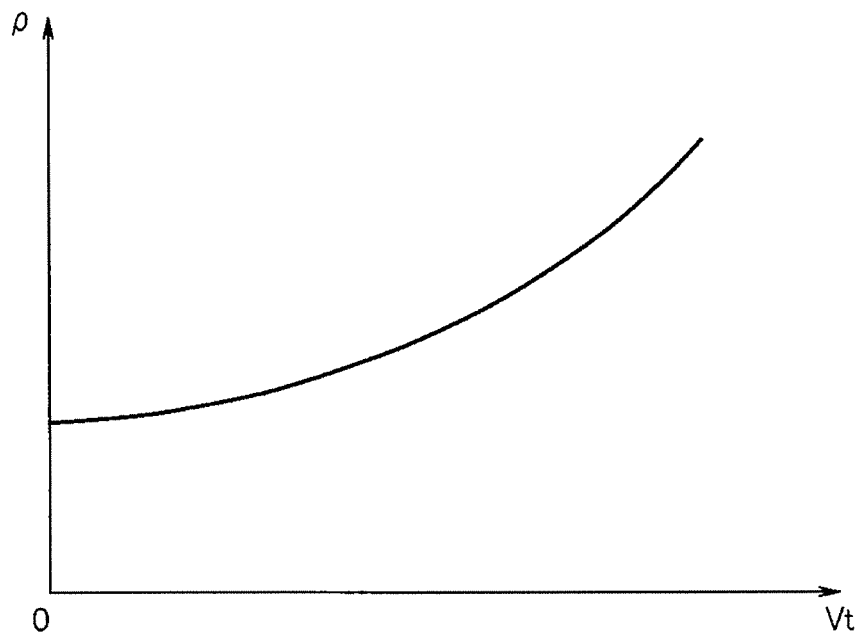
FIG. 13 is an illustrative view of a turning radius set depending on a vehicle speed according to the example of the present invention.
Figure 14:
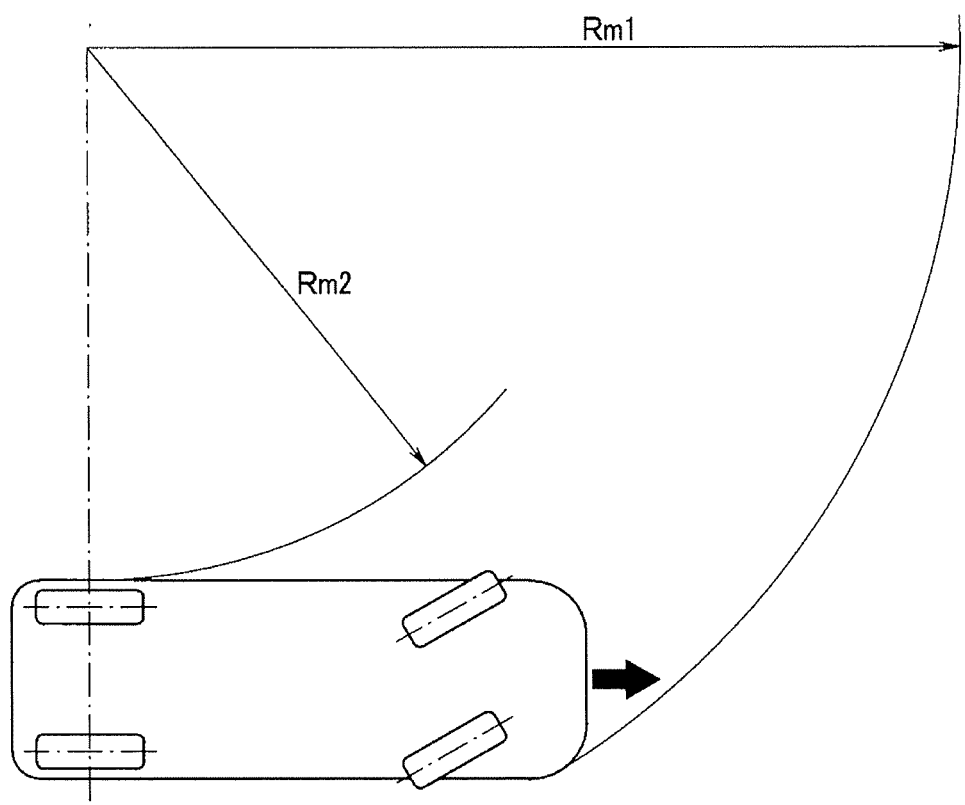
FIG. 14 is an illustrative diagram of an outer vehicle body minimum turning radius and an inner vehicle body minimum turning radius according to the embodiment of the present invention.

After the turning vehicle speed Vt has been set in S111, the program proceeds to S112, a turning path is set, the right or left turning control is executed based on the turning path, and the program proceeds to S113 in which the self-driving is continued (refer to FIG. 7). In this case, for example, as illustrated in FIG. 13, in the turning path set in S112, a turning radius ρ is set according to the turning vehicle speed Vt set in advance through experiments, calculations, or the like, and the turning radius ρ is set by securing a region between an outer vehicle body minimum turning radius Rm1 and an inner vehicle body minimum turning radius Rm2 at a portion of the right or left turn road as illustrated in FIG. 14.

On the other hand, if it is determined in S110 that W1 Wc2 is met, the program proceeds to S114, in which it is determined whether an obstacle such as an oncoming vehicle is present in an adjacent lane.

Figure 8:
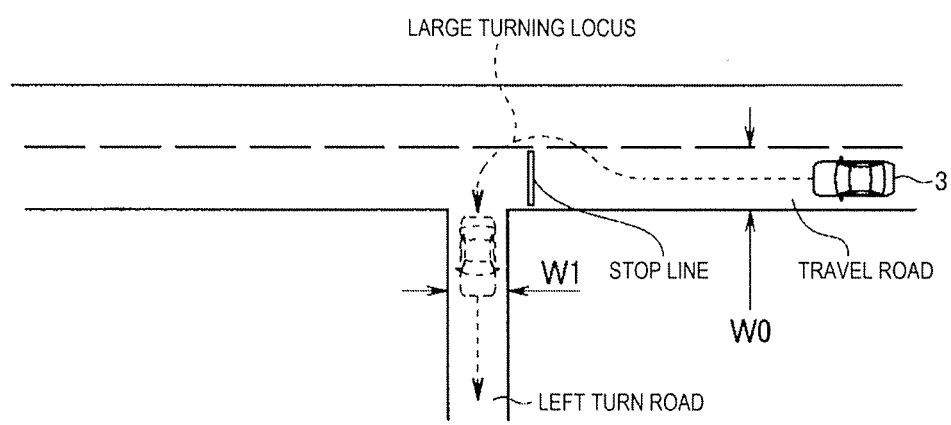
FIG. 8 is an illustrative diagram of a case where a turning radius of a turning path is largely corrected and the vehicle turns left on a left turn road that is left turnable on a travel lane in which no oncoming vehicle is present according to the example of the present invention.

As a result of the determination in S114, if it is determined that there is no obstacle such as the oncoming vehicle in the adjacent lane, the program proceeds to S115, and as illustrated in FIG. 8, a large turning path set in advance is corrected to increase the turning radius of the traveling path so as to advance straight from the traveling lane to the lane after having turned to the right or left is set.

Subsequently, the program proceeds to S116 in which it is determined whether the vehicle 3 is stopped. If the vehicle 3 is stopped, the program proceeds to S117 where the vehicle is started, and the program proceeds to S118. If the vehicle 3 is not stopped, the program jumps to S118.

In S118, the turning vehicle speed Vt at the time of turning to the right or left at the right or left turn road is set to an extremely low speed (for example, less than 10 km/h), and the right or left turning control is executed based on the large turning path set in S115 described above. The program proceeds to S119, and the self-driving is continued.

Figure 9:
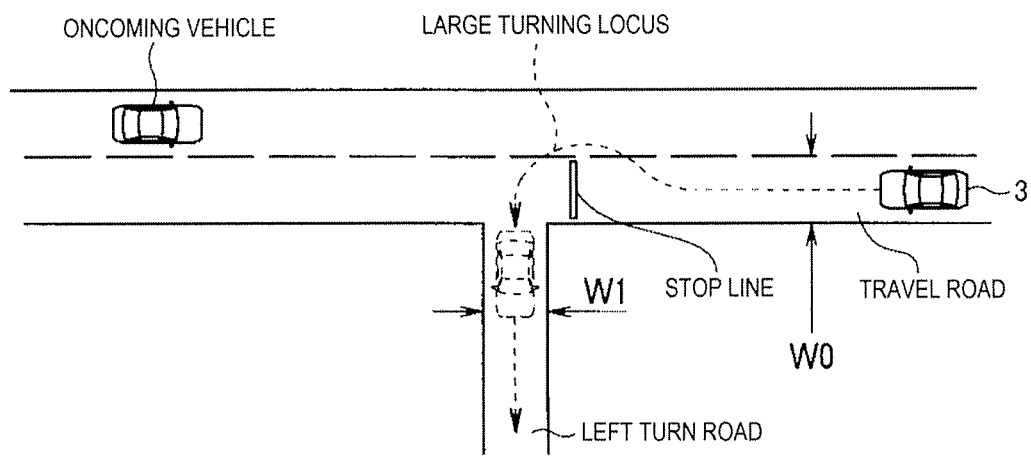
FIG. 9 is an illustrative diagram of a case where a turning radius of a turning path is largely corrected and the vehicle turns left on a left turn road that is left turnable on a travel lane in which an oncoming vehicle is present according to the example of the present invention.

If it is determined that the obstacle such as the oncoming vehicle is present on the adjacent lane in S114 described above, the program proceeds to S120, and a collision allowance time tttc=−(relative distance)/(relative speed) is calculated with the existing obstacle as a target (refer to FIG. 9).

Next, the program proceeds to S121, where it is determined whether the collision allowance time tttc has become shorter than a threshold value tlim (tttc≤tlim) set in advance by experiments, calculations, or the like.

If tttc>tlim is met as a result of the determination in S121, and it can be determined that there is no possibility of collision with the obstacle such as the oncoming vehicle, the program proceeds to S115 described above.

On the contrary, when tttc≤tlim is met and there is a possibility of collision with the obstacle such as the oncoming vehicle, the program proceeds to S122, and a deceleration stop control for gradually decelerating and stopping at the stop line is executed.

Next, the program proceeds to S123, and it is determined whether a safety ensuring time (fixed time) set in advance by experiments, calculations, or the like has elapsed.

As a result of the determination in S123, if the safety ensuring time has elapsed in a state of tttc≤tlim, it is determined that it is difficult to ensure the traveling path necessary for turning the right or left at the current right or left road even if awaiting is performed without any change because of an oncoming vehicle or an obstacle. The program proceeds to S124 where the vehicle is started and the program proceeds to S125 where the target course in the self-driving is reset to a course not to turn to the right or left at the currently set right or left turn road. The program proceeds to S126 to continue the self-driving.

If it is determined in S123 that the safety ensuring time has not elapsed, the process from S114 is repeated again.

Figure 2:
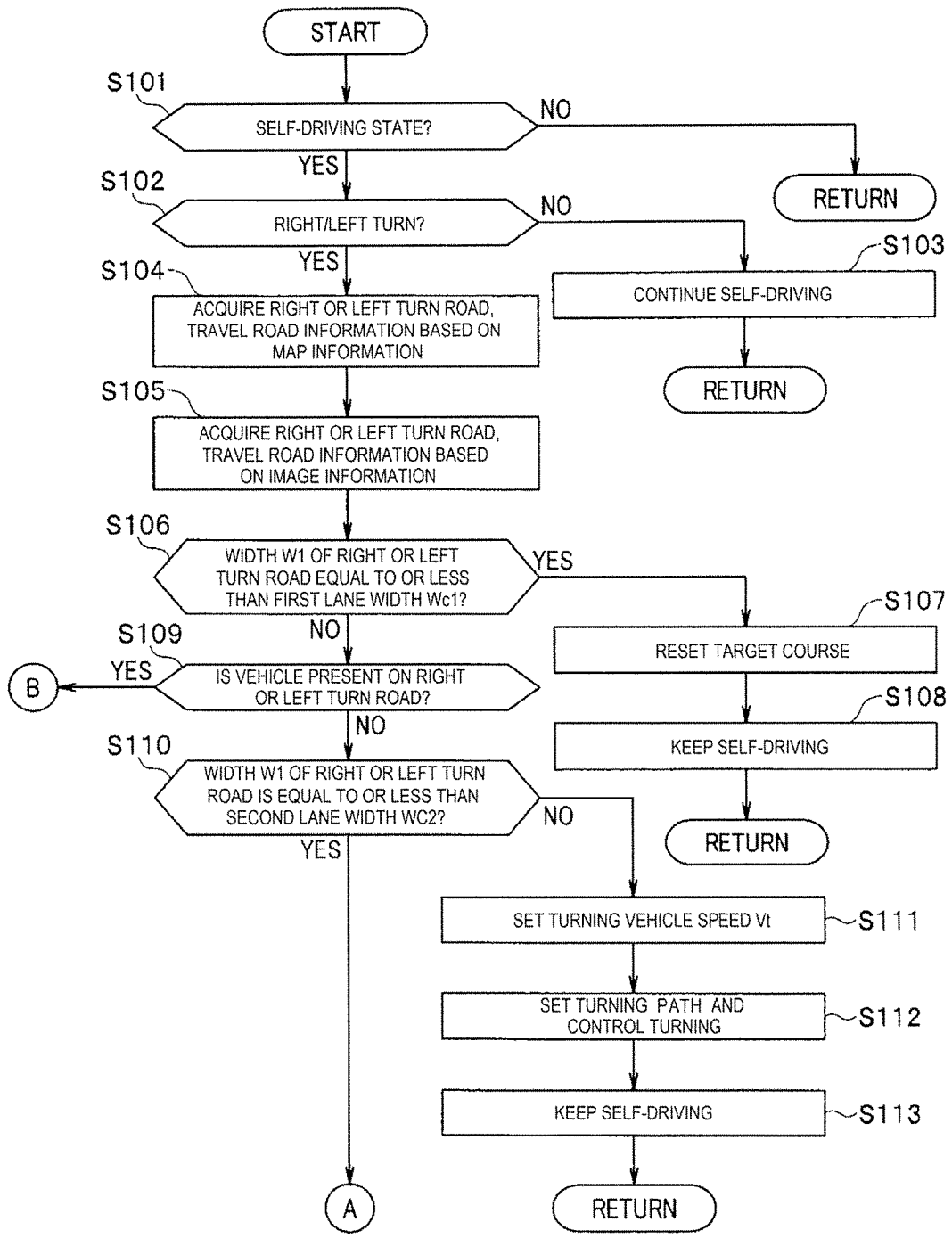
FIG. 2 is a flowchart of a self-driving control program according to the example of the present invention.
Figure 3:
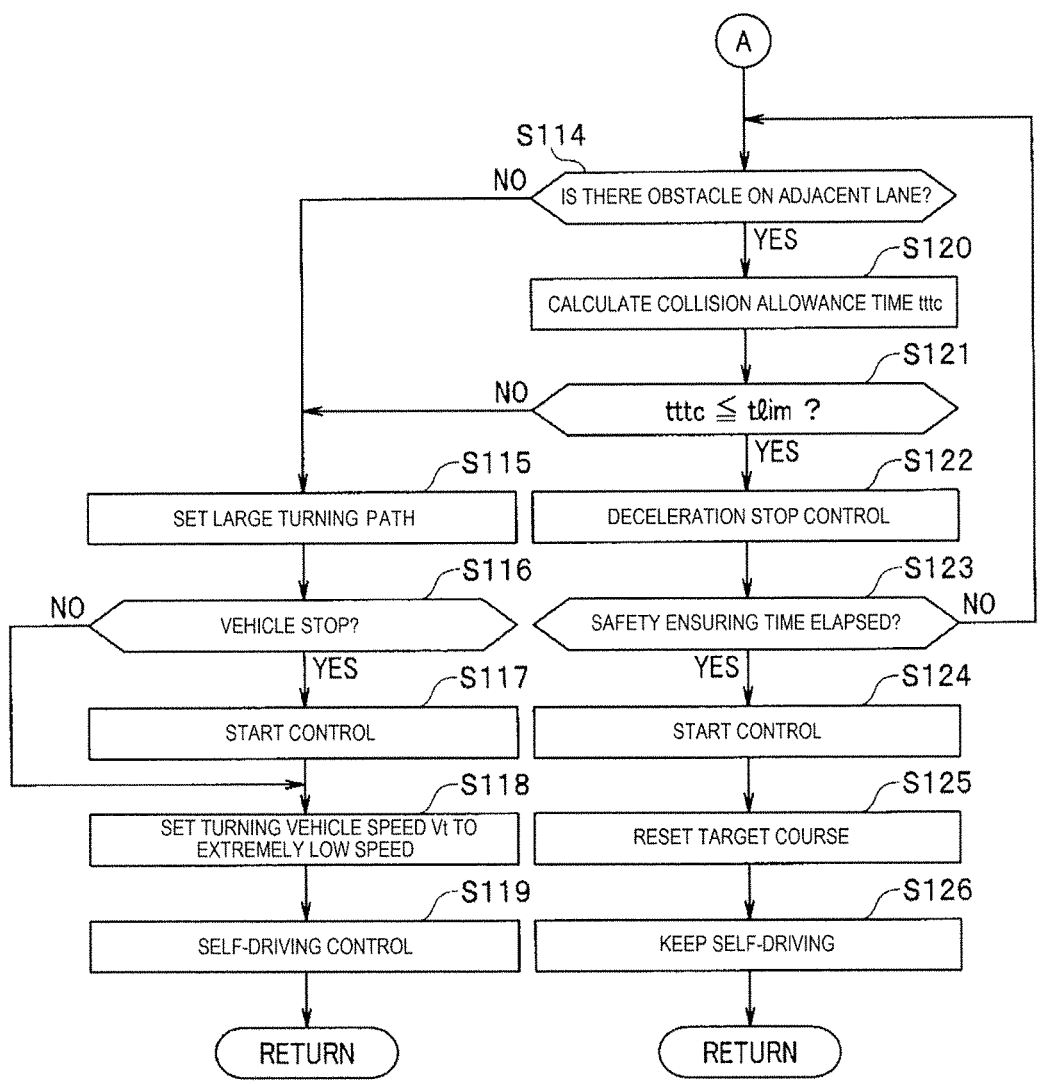
FIG. 3 is a flowchart continued from FIG. 2.
Figure 4:
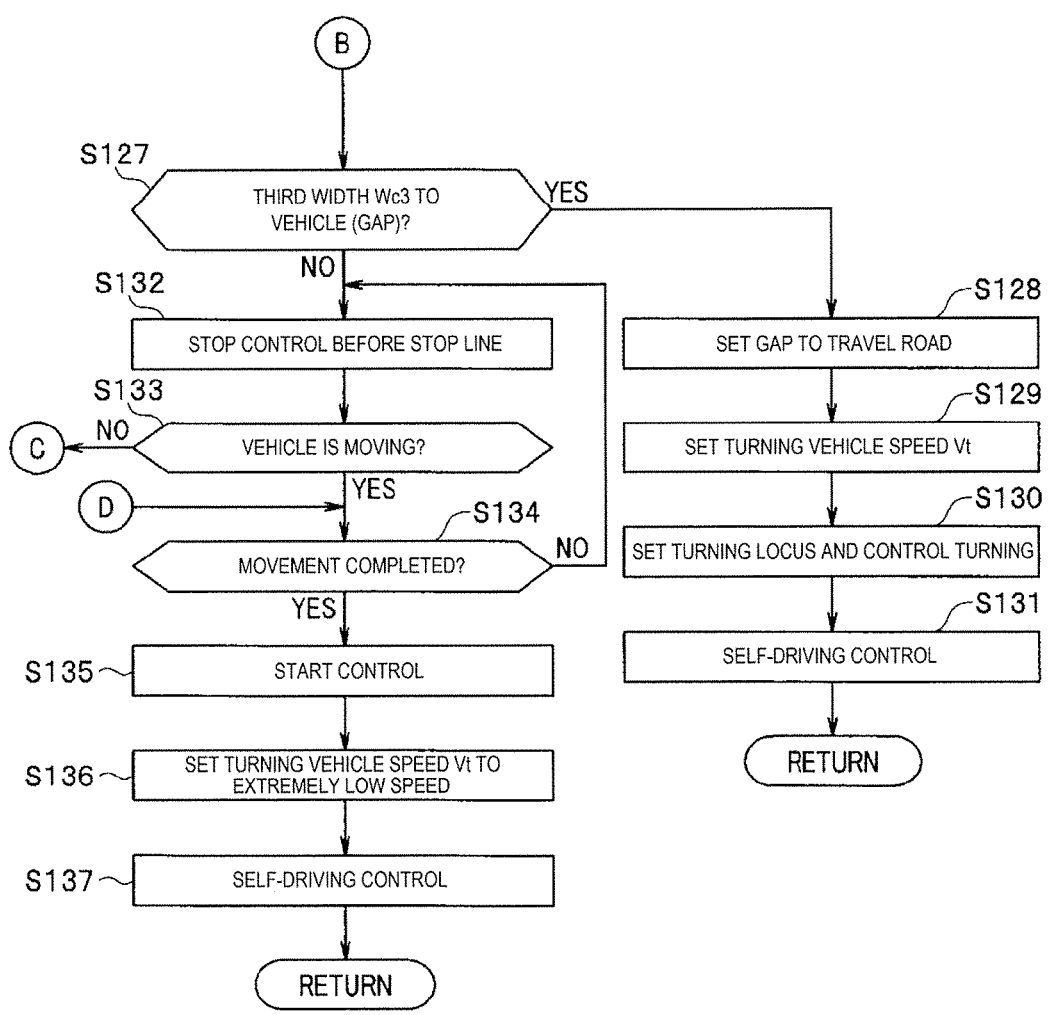
FIG. 4 is a flowchart continued from FIG. 2.
Figure 5:
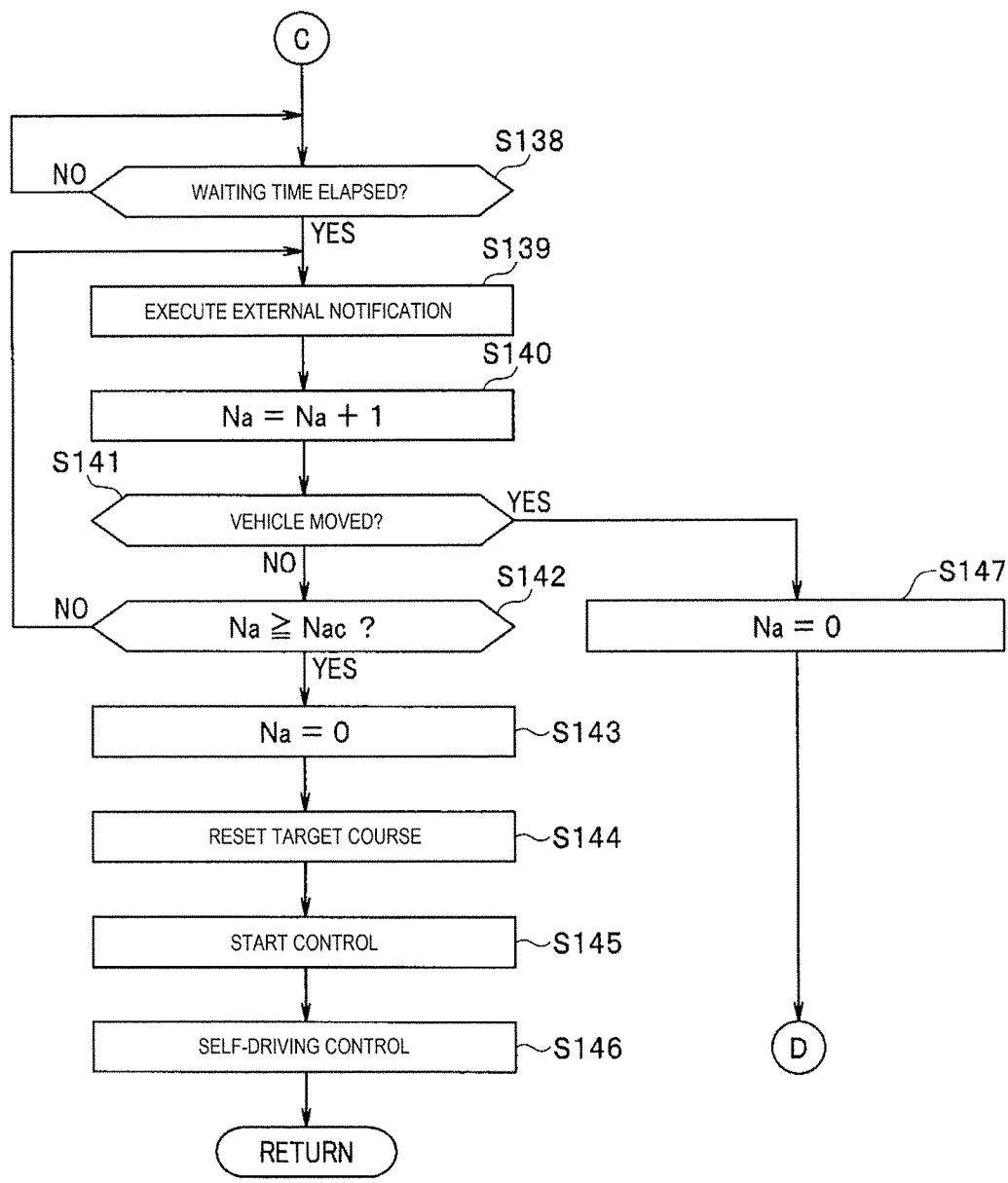
FIG. 5 is a flowchart continued from FIG. 4.

On the other hand, if it is determined in S109 of FIG. 2 that there is another vehicle on the right or left turn road (refer to FIG. 10), the program proceeds to S127 where it is determined whether there is a predetermined third lane width Wc3 (W2≥Wc3) through which the vehicle 3 can pass on a side (a width W2 of a gap thereof) of the vehicle on the right or left turn road.

As a result of the determination in S127, if it is determined that W2≥Wc3 is met, the program proceeds to S128 to set the gap as a travel road.

Next, the program proceeds to S129 where the width W2 of the gap is set as a lane width, and for example, the turning vehicle speed Vt is calculated through Expression (1) described above. In this case, the vehicle speed V1 set in advance based on the width W1 of the right or left turn road in Expression (1) described above is set as the vehicle speed V1 set in advance based on the width W2.

Thereafter, the program proceeds to S130, where a preset turning path that turns to the right or left through the gap is set, the turning control is executed, and the program proceeds to S131 where the self-driving control is performed.

If it is determined as a result of the determination in S127 that W2<Wc3 is met, the program proceeds to S132, in which the deceleration stop control for gradually decelerating and stopping at the stop line is executed.

Next, the program proceeds to S133, where it is determined whether another vehicle in the right or left turn road is moving. As a result of the determination, if it is determined that the vehicle is moving, the program proceeds to S134, and it is determined whether the movement has been completed. For example, when another vehicle in the right or left turn road has moved to turn to the right or left onto the traveling lane of the vehicle 3, it is determined whether the movement of the other vehicle for the right or left turn has been completed.

If it is determined in S134 that the movement of another vehicle has been completed, the program proceeds to S135, the vehicle is started, the program proceeds to S136, the turning vehicle speed Vt is set to an extremely low speed, the turning control is executed, and the program proceeds to S137 where the self-driving control is performed.

On the other hand, if it is determined in S133 that another vehicle is not moving (stopping), the program proceeds to S138 to wait until a waiting time set in advance by experiments, calculations, or the like has elapsed. When the waiting time has elapsed, the program proceeds to S139, where another vehicle being stopped is encouraged to move in advance by klaxon, horn, headlight flashing, or the like (priority is given to the right or left turn onto the traveling lane of the vehicle 3, or the like).

Next, the program proceeds to S140, and a notification counter Na for counting notification is incremented (Na=Na+1).

Then, the program proceeds to S141, where it is determined whether another vehicle has moved.

As a result of the determination in S141, if it is determined that another vehicle is not moving (is stopping), the program proceeds to S142, where it is determined whether the notification counter Na has become equal to or larger than a count value Nac that has been set in advance (for example, 3 times). If it is determined that the notification value Na has not yet reached the count value Nac which has been set in advance, the process from S139 is repeated. If it is determined that the notification value Na has reached the count value Nac that has been set in advance, the program proceeds to S143 and the notification counter Na (Na=0) is cleared.

After the notification counter Na has been cleared in S143, it is determined that the vehicle 3 cannot turn to the right or left for another vehicle as it is. The program proceeds to S144, where the target course in the self-driving is reset to a course in which the right or left turn is not performed at the right or left turn road set currently. The program proceeds to S145 where the vehicle is started, and the program proceeds to S146 where the self-driving control is performed.

If it is determined in S141 that another vehicle has moved, the program proceeds to S147, in which the notification counter Na is cleared (Na=0) and the process from S134 is performed.

As described above, according to the example of the present invention, in the self-driving state, the execution of the right turn and the left turn from the traveling lane of the vehicle 3 is estimated based on the traveling state of the vehicle and the traveling environment information, and the traveling path from the traveling lane to the right or left turn road is made variable according to the traveling state of the vehicle 3 and the traveling environment information to control the right and left turns when execution of either of the right turn or the left turn from the traveling lane of the vehicle 3 is estimated. Specifically, when the lane width W1 of the right or left turn road is narrower than the first lane width Wc1, the right or left turn from the traveling lane to the right or left turn road is prohibited. When the lane width W1 of the right or left turn road is wider than the preset first lane width Wc1 and does not exceed a second lane width Wc2, a turning radius of the traveling path turning to the right or left from the traveling lane to the right or left turn road is corrected to increase so that the vehicle can go straight to the right or left turn road. Furthermore, when another vehicle is detected on the right or left turn road, a movement situation of another vehicle is monitored. When another vehicle is moving, after the movement of another vehicle has been completed, the right or left turn control from the traveling lane to the right or left turn road is executed. In addition, when another vehicle is stopped, an external notification device 26 issues a signal to another vehicle stopped to preferentially perform the movement of another vehicle. For that reason, the execution and non-execution of right and left turns can be accurately determined on the basis of the road environment even when performing self-driving, and the right turn and the left turn can be performed safely and smoothly with an appropriate traveling path at an appropriate vehicle speed in executing the right and left turns.

The invention claimed is:

1. A travel control device for a vehicle traveling on a first road, the travel control device comprising:
   a controller configured to:
      receive a traveling state of the vehicle;
      receive traveling environment information of the vehicle;
      execute a self-driving control of the vehicle based on the received traveling state and the received traveling environment information;
      when the vehicle makes a right turn or a left turn from the first road into a second road, determine a width of the second road into which the vehicle is to make the right turn or the left turn from the first road based on the traveling environment information, the first road intersecting the second road; and
      execute a right turn control or a left turn control of the vehicle from the first road into the second road based on the determined width of the second road,
   wherein when the controller detects 1) another vehicle on the second road and 2) the another vehicle is moving, the controller delays, until the another vehicle on the second road stops moving or is not detected, the execution of the right turn control or the left turn control of the vehicle from the first road to the second road.

2. The travel control device according to claim 1, wherein when the width of the second road is equal to or less than a preset width, the execution of the right turn control or the left turn control of the vehicle from the first road into the second road is prohibited.

3. The travel control device according to claim 2, wherein, during the execution of the right turn control or the left turn control of the vehicle from the first road to the second road, when the width of the second road is greater than a preset first width and is less than a preset second width, the controller allows the vehicle to 1) make the right turn into the second road after the vehicle steers in a direction opposite the right turn or 2) make the left turn into the second road after the vehicle steers in a direction opposite the left turn so that a longitudinal axis of the vehicle is parallel to the second road when entering the second road from the first road.

4. The travel control device for according to claim 3, wherein when the controller detects 1) the another vehicle on the second road and 2) the another vehicle is stopped, the controller transmits, to the another vehicle, a signal for prompting the another vehicle to move before the vehicle makes the right turn or the left turn into the second road.

5. The travel control device according to claim 1, wherein, during the execution of the right turn control or the left turn control of the vehicle from the first road to the second road, when the width of the second road is greater than a preset first width and is less than a preset second width, the controller allows the vehicle to 1) make the right turn into the second road after the vehicle steers in a direction opposite the right turn or 2) make the left turn into the second road after the vehicle steers in a direction opposite the left turn so that a longitudinal axis of the vehicle is parallel to the second road when entering the second road from the first road.

6. The travel control device according to claim 5, wherein when the controller detects 1) the another vehicle on the second road and 2) the another vehicle is stopped, the controller transmits, to the another vehicle, a signal for prompting the another vehicle to move before the vehicle makes the right turn or the left turn into the second road.

7. The travel control device according to claim 1, wherein when the controller detects 1) the another vehicle on the second road and 2) the another vehicle is stopped, the controller transmits, to the another vehicle, a signal for prompting the another vehicle to move before the vehicle makes the right turn or the left turn into the second road.

8. The travel control device for according to claim 1, wherein when the controller is configured to:
when the width of the second road is equal to or less than a preset first width, prohibit the execution of the right turn control or the left turn control of the vehicle from the first road into the second road;
when the width of the second road is greater than the preset first width and less than a preset second width, allow the vehicle to 1) make the right turn into the second road after the vehicle steers in a direction opposite the right turn or 2) make the left turn into the second road after the vehicle steers in a direction opposite the left turn so that a longitudinal axis of the vehicle is parallel to the second road when entering the second road from the first road; and
when the width of the second road is greater than the preset second width, allow the vehicle to make the right turn or the left turn into the second road from the first road without steering the vehicle in a direction opposite the from the right turn or the left turn.

9. A travel control device for a vehicle traveling on a first road, the travel control device comprising:
a controller configured to:
receive a traveling state of the vehicle;
receive traveling environment information of the vehicle;
execute a self-driving control of the vehicle based on the received traveling state and the received traveling environment information;
when the vehicle makes a right turn or a left turn from the first road into a second road, determine a width of the second road into which the vehicle is to make the right turn or the left turn from the first road based on the traveling environment information, the first road intersecting the second road; and
execute a right turn control or a left turn control of the vehicle from the first road into the second road based on the determined width of the second road,
wherein when the controller detects 1) another vehicle on the second road and 2) the another vehicle is stopped, the controller transmits, to the another vehicle, a signal for prompting the another vehicle to move before the vehicle makes the right turn or the left turn into the second road.

* * * * *